United States Patent
Koppe et al.

(10) Patent No.: US 6,999,811 B2
(45) Date of Patent: Feb. 14, 2006

(54) METHOD AND DEVICE FOR THE REGISTRATION OF TWO 3D IMAGE DATA SETS

(75) Inventors: Reiner Koppe, Hamburg (DE); Erhard Paul Artur Klotz, Neumuenster (DE); Johannes Catharina Antonius Op de Beek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 594 days.

(21) Appl. No.: 10/197,546

(22) Filed: Jul. 17, 2002

(65) Prior Publication Data

US 2003/0021381 A1 Jan. 30, 2003

(30) Foreign Application Priority Data

Jul. 25, 2001 (DE) .................................. 101 36 160

(51) Int. Cl.
*A61B 5/05* (2006.01)
(52) U.S. Cl. .................. 600/426; 382/287; 382/294
(58) Field of Classification Search ............... 382/287, 382/294; 600/426, 431, 424; 606/130
See application file for complete search history.

(56) References Cited

U.S. PATENT DOCUMENTS

| | | | | |
|---|---|---|---|---|
| 4,945,914 A | * | 8/1990 | Allen | 600/426 |
| 5,636,255 A | * | 6/1997 | Ellis | 378/20 |
| 5,638,819 A | * | 6/1997 | Manwaring et al. | 600/424 |
| 5,839,440 A | * | 11/1998 | Liou et al. | 600/431 |
| 6,421,551 B1 | * | 7/2002 | Kuth et al. | 600/410 |
| 6,484,049 B1 | * | 11/2002 | Seeley et al. | 600/426 |
| 2003/0086535 A1 | * | 5/2003 | Teppaz et al. | 378/207 |

* cited by examiner

*Primary Examiner*—Ali Imam
*Assistant Examiner*—Julianne M. Sullivan
(74) *Attorney, Agent, or Firm*—Douglas B. McKnight

(57) ABSTRACT

A method and a device provide for the registration of two 3D image data sets of an object to be examined. The object to be examined is provided with a plurality of markers In order to enable a registration to be carried out, the positions of the markers in the 3D image data sets are first determined in a co-ordinate system associated with the relevant 3D image data set. The distances between the markers and/or the angles formed between lines which intersect in a marker and extend through two further markers are then determined. Finally, a transformation rule for the transformation of one of the 3D image data sets to the co-ordinate system of the other 3D image data set is determined.

11 Claims, 3 Drawing Sheets

METHOD AND DEVICE FOR THE REGISTRATION OF TWO 3D IMAGE DATA SETS

BACKGROUND

The invention relates to a method and a corresponding device for the registration of two 3D image data sets of an object to be imaged which is provided with a plurality of markers which are contained in the 3D image data sets. The invention also relates to an imaging device for the acquisition of medical 3D image data sets of an object to be imaged as well as to a computer program product.

Notably in the medical field it is often necessary to combine two or more 3D image data sets of the same object to be imaged, for example, a part of a patient, with adequate accuracy. Such 3D image data sets may be formed by means of the same or different imaging modalities, for example, X-ray techniques, computed tomography, an ultrasound technique or magnetic resonance tomography; moreover, the 3D image data sets may have been acquired at more or less large intervals in time.

In order to carry out the desired combination of the 3D image data sets it is necessary to realize so-called registration where the spatial relationship of the two 3D image data sets is determined and a transformation rule is defined in order to transform one of the two 3D image data sets to the co-ordinate system of the respective other 3D image data set. To this end, artificial or anatomical markers are often used so as to determine the spatial relationship of the 3D image data sets relative to one another.

A method of this kind is known from "Automated registration of multimodal brain image sets using computer vision methods", G. Secretta, P. Gregson, Computers in biology and medicine 29 (1999), pp. 333 to 359. A frame which comprises two triangles on which markers which can be imaged are provided is then fitted to the head of a patient. The positions of the triangles are determined on the basis of the imaged markers by means of computer image processing, after which the transformation rule for the transformation of a 3D image data set to the co-ordinate system of the other 3D image data set is derived from said positions by means of quaternion mathematics.

SUMMARY OF THE INVENTION

It is an object of the present invention to provide an alternative and simple method for the registration of two 3D image data sets. This object is achieved in accordance with the invention by means of a method as disclosed in claim 1, which method includes the following steps:
a) determining the positions of the markers in the 3D image data sets in a co-ordinate system associated with the relevant 3D image data set,
b) determining the distances between two markers and/or the angle between two straight lines which intersect a marker and extend through two further markers,
c) determining corresponding distances and/or angles in the 3D image data sets,
d) determining the corresponding markers on the basis of the corresponding distances and/or angles determined,
e) determining a transformation rule for the transformation of one of the 3D image data sets to the co-ordinate system of the other 3D image data set.

The invention is based on the recognition of the fact that in the case of an orthogonal transformation of the object to be imaged, said distances and angles between markers in a fixed position are invariant between the acquisition of the two 3D image data sets. This means that on the basis of the distances and/or angles between the markers in the relevant 3D image data sets it can be determined which marker images in the two 3D image data sets originate from the same marker, even when a comparatively large shift or rotation of the object to be imaged has occurred between the acquisition of the 3D image data sets. The method can in most cases still be used after a small expansion or compression of the object to be imaged, so that a useful result is obtained nevertheless. The method in accordance with the invention is notably suitable for use also in the case of very large shifts or rotations of the object to be imaged whereas known registration methods are conceived notably for very small shifts or rotations and work only inaccurately or not at all in the case of large shifts or rotations.

Advantageous versions of the method in accordance with the invention are disclosed in the dependent claims. A device for the registration in accordance with the invention is disclosed in claim 9. Such a device is particularly advantageously used for an imaging device intended for the acquisition of medical 3D image data sets of an object to be imaged in accordance with claim 10; such an imaging device is preferably an X-ray device, that is, notably an X-ray computed tomography apparatus or a C-arm X-ray device suitable for the acquisition of, for example, 3D rotation angiograms.

Finally, the invention also relates to a computer program product with computer programming means for making the computer carry out the method in accordance with the invention when the computer program product is run on a computer.

It is to be noted that the devices in accordance with the invention may be further elaborated in the same or similar way as the method in accordance with the invention and as disclosed in the dependent claims in relation to the method in accordance with the invention.

The number of markers required and the number of angles and/or distances to be determined notably are a function of the desired accuracy and of how unambiguously the distances and/or angles determined in the two 3D image data sets can be associated with one another. When indeed there is no ambiguity, in given circumstances it suffices to use three markers and to determine three distances or angles in order to determine the transformation rule. However, if all degrees of freedom of shift and rotation of the object to be examined are to be taken into account and determined, preferably, six or more distances and/or angles should be determined; to this end, at least four but preferably at least six markers are to be provided on the object to be imaged. Preferably, in accordance with the invention, distances between all combinations of markers and all angles formed between lines intersecting multiple markers are determined.

Preferably, the markers are provided on the object to be imaged in such a manner that the distances and the angles differ as much as possible, thus enabling unambiguous association of the angles and distances in a first 3D image data set with angles and distances determined in the second 3D image data set. Association is performed in that a distance or angle in the first 3D image data set is associated with that distance or angle in the second 3D image data set whose magnitude is as identical or as close as possible to the angle or distance of the first 3D image data set.

Preferably, the corresponding markers in the 3D image data sets are associated iteratively on the basis of the corresponding distances in the individual 3D image data set; this means that a plurality of steps is required so as to enable the corresponding markers to be determined from corresponding distances. Alternatively, from the corresponding angles determined the corresponding markers are derived directly at the point of intersection of the lines wherebetween the corresponding angles are situated. However, for the same number of markers the number of angles, that is, the number among which a corresponding angle must be searched, is larger than the number of distances between two markers.

Preferably, use is made of artificial markers provided on the object to be imaged. These markers are designed is such a manner that they appear visibly in the images formed in the relevant imaging modality, so that their position in the 3D image data set or the associated co-ordinate system can be unambiguously determined. The markers may be distributed essentially at will across the object to be imaged, be it that the distances and/or angles between the markers are preferably as different as possible. Such markers in the X-ray technique often consist of spheres which are filled with a contrast medium and are attached to the patient. Magnetic resonance tomography often utilizes spheres which are filled with water and attached to the patient. However, other forms are also feasible (for example, metal spheres). The spheres may also be arranged on an auxiliary frame or in a belt or even be implanted. Moreover, the markers may also be anatomical features such as, for example, special bone structures, bifurcations of the vascular tree or similar characteristic locations of the anatomy which are very well visible in the images formed and whose positions can be determined. The method in accordance with the invention can be advantageously used notably for 3D rotation angiography, that is, notably for subtraction angiography where the registration method in accordance with the invention must be carried out for the registration of essentially complete 3D image data sets prior to the subtraction of two 3D image data sets.

The registration method in accordance with the invention also enables the combining of incomplete 3D image data sets which have been acquired in different positions of the object to be imaged or with a different imaging geometry, thus forming a complete 3D image data set. For example, it may be that two incomplete 3D image data sets are acquired by means of a C-arm X-ray device which can travel only along a trajectory of 90° around the patient, for example, once from the frontal direction relative to the patient and once from the lateral direction, in which case the patient must be rotated once through 90°; these two "half" 3D image data sets can then be combined by means of the method in accordance with the invention by determining a transformation rule on the basis of the markers.

The following description, claims and accompanying drawings set forth certain illustrative embodiments applying various principles of the present invention. It is to be appreciated that different embodiments applying principles of the invention may take form in various components, steps and arrangements of components and steps. These described embodiments being indicative of but a few of the various ways in which some or all of the principles of the invention may be employed in a method or apparatus. The drawings are only for the purpose of illustrating an embodiment of an apparatus and method applying principles of the present invention and are not to be construed as limiting the present invention.

BRIEF DESCRIPTION OF THE DRAWINGS

The foregoing and other features and advantages of the present invention will become apparent to those skilled in the art to which the present invention relates upon consideration of the following detailed description of apparatus applying aspects of the present invention with reference to the accompanying drawings, wherein:

FIG. 4b is a second co-ordinate system, rotated relative to the co-ordinate system shown in FIG. 4a.

DETAILED DESCRIPTION

Figure 1:
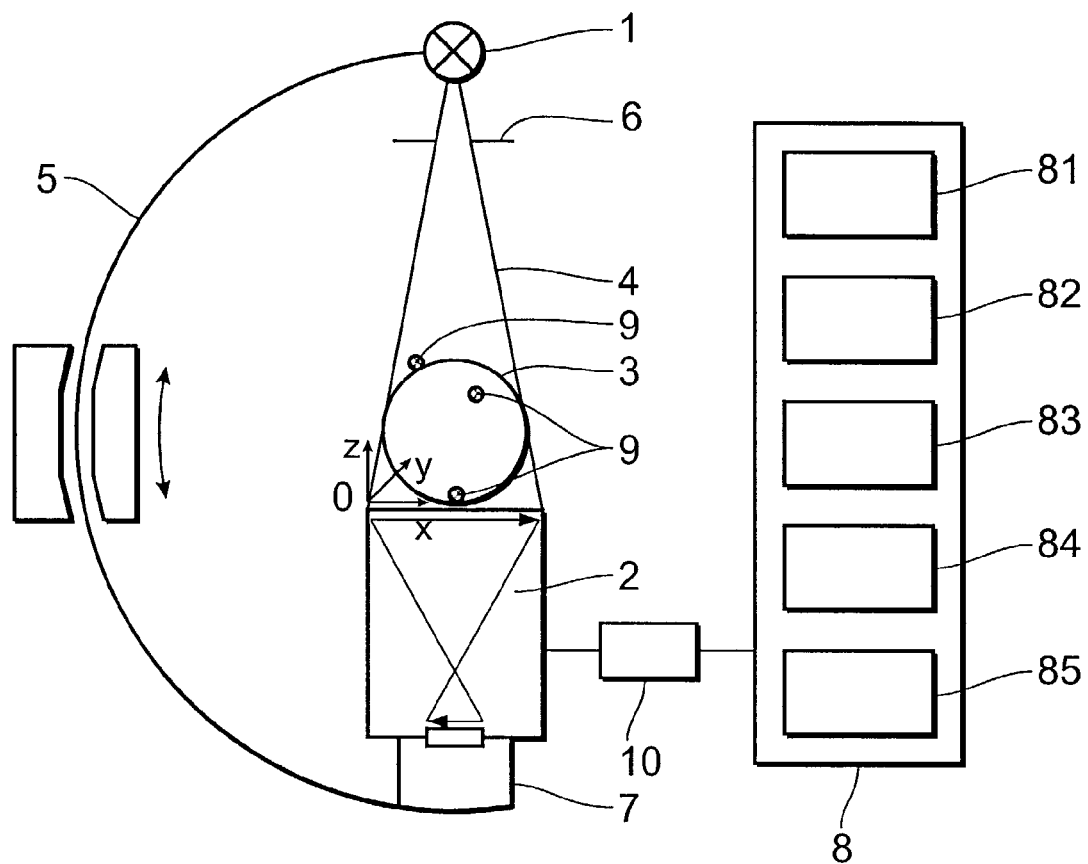
FIG. 1 is a diagrammatic representation of an X-ray device in accordance with the invention.

FIG. 1 is a diagrammatic representation of a C-arm X-ray device in accordance with the invention. On a C-arm 5 there are mounted an X-ray source 1 and an X-ray image intensifier 2 which faces the X-ray source 1 and includes a TV camera 7. An X-ray beam 4 may be incident on an object 3 to be imaged, for example, a patient or a part of a patient, via the aperture of a diaphragm 6, said object absorbing the X-rays to a varying extent. For the acquisition of projection data of the object 3 to be imaged, the X-ray source is moved along a trajectory around the object 3 to be imaged; a respective projection data set is then acquired from different positions during said movement. Subsequently, a 3D image data set can be reconstructed from said projection data sets; desired images of the object 3 to be examined, for example, images of different slices and from different angles of view can be formed from said 3D image data set.

The method in accordance with the invention will be described in detail hereinafter on the basis of the example concerning subtraction angiography. To this end, two as complete as possible 3D image data sets of the same object to be imaged are acquired; during the first acquisition projection data is acquired without a contrast medium being injected into the object to be imaged while during the second data acquisition a contrast medium is injected. After construction of the two 3D image data sets and subtraction of the two 3D image sets, for example, an image of the vascular tree can be obtained in the subtraction image.

The object 3 to be imaged is situated as much as possible in the same position during the two data acquisition operations. As is shown in FIG. 1, a plurality of markers 9 is fixed to the object 3 to be imaged. These markers 9 are preferably attached in such a manner that the distances between two markers and the angles between two straight lines which intersect in a marker and extend each time through a further marker are different. Thus, these markers are also included in both data acquisitions and hence can be clearly recognized in the 3D image data sets. However, because the data acquisition may require a substantial period of time, it often happens that a patient moves during the data acquisition or in the interval between the acquisition of the projection data for the first 3D image data set and the second 3D image data set. However, registration and a compensation of this movement must be performed before subtraction of the two 3D image data sets can be carried out; the movement of the patient must thus be mathematically calculated and compensated. To this end there is provided a suitable arithmetic unit 8, which is supplied with input data in the form of the 3D image data sets reconstructed by means of the reconstruction unit 10.

Figure 2A:
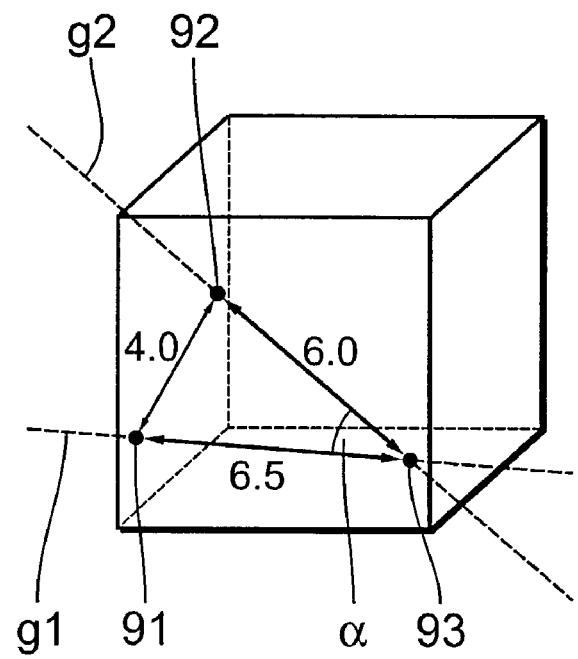
FIG. 2 shows two distributions of markers in different 3D image data sets.
Figure 2B:
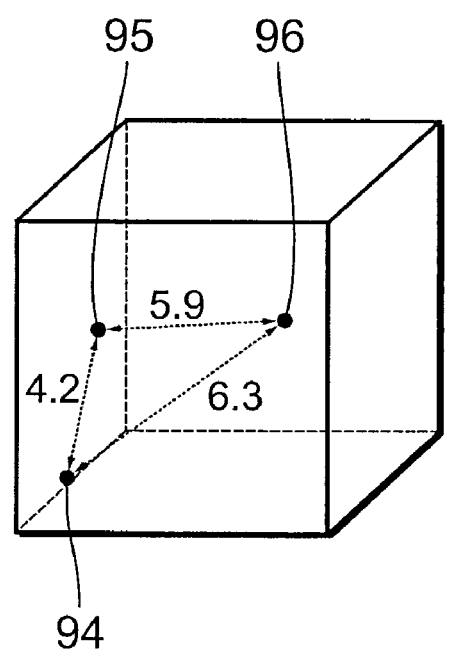

The arithmetic unit 8 includes first of all means 81 for determining the positions of the markers in the relevant 3D image data set or in an associated co-ordinate system. Also provided are means 82 for determining the distances between two markers in the individual 3D image data sets and/or for determining the angle between straight lines in the individual 3D image data sets which intersect in a marker and extend through two further markers. This will be illustrated with reference to FIG. 2. FIG. 2a shows three markers 91, 92, 93 in a first 3D image data set as well as the distances between these three markers 91, 92, 93. FIG. 2b shows the same three markers 94, 95, 96 in a second 3D image data set, again together with the relevant distances between the individual markers 94, 95, 96. However, it is not known which markers 94, 95, 96 in the second 3D image data set are to be associated with which one of the markers 91, 92, 93 in the first 3D image data set. This association will be determined on the basis of the method in accordance with the invention.

The determination of the positions of the markers 91 to 96 in the individual 3D image data sets and of the distances between the markers is performed by means of respective known methods. For example, the determination of the distances can be carried out by way of stereometric measurement. For each 3D image data set a so-called distance table can thus be formed; such a table would be as follows for the present example:

| Markers n | 91 | 92 | 93 | Markers n' | 94 | 95 | 96 |
| --- | --- | --- | --- | --- | --- | --- | --- |
| 91 | 0 | 4.0 | 6.5 | 94 | 0 | 4.2 | 6.3 |
| 92 | 4.0 | 0 | 6.0 | 95 | 4.2 | 0 | 5.9 |
| 93 | 6.5 | 6.0 | 0 | 96 | 6.3 | 5.9 | 0 |

Figure 3:
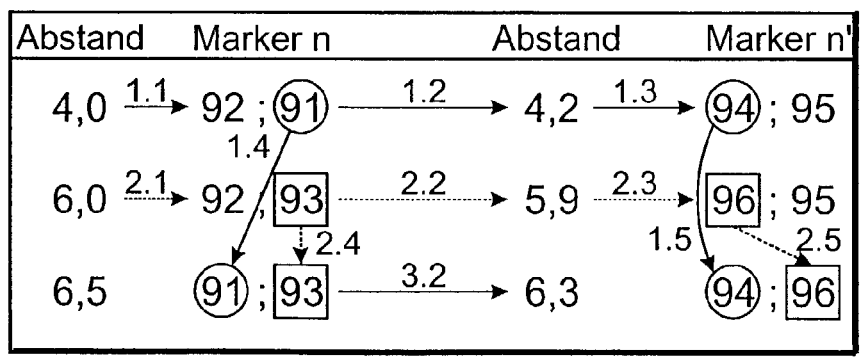
FIG. 3 illustrates subtraction angiography utilizing the method in accordance with the invention.

Subsequently, means 83 and 84 in FIG. 1 determine the correspondence between markers in the two 3D image data sets with the aid of such Tables. This operation is performed iteratively. To this end, first the correspondence between distances between the first and the second Table, that is, the first and the second 3D image data set, is established by means of the arithmetic unit 83. For example, in a first step (1.2 in FIG. 3) the distance in the second Table which corresponds to the distance 4.0 between the markers 91 and 92 is determined. This is the distance 4.2 which is nearest to the distance 4.0 and exists between the markers 94 and 95. In the next step (2.2) the distance in the second 3D image data set which corresponds to a further distance in the first 3D image data set is determined, for example, the distance 6.0 between the markers 92 and 93. This is the distance 5.9 between the markers 95 and 96. From the first two iterative steps it can thus already be deduced that the marker 92 has to correspond to the marker 95. In a third iterative step (3.2), automatically occurring in the case of three markers, the distance corresponding to the distance 6.5 is determined, yielding the distance 6.3 in the second 3D image data set. Finally, taking into account the results of the first two iterative steps it can be deduced that the marker 91 should correspond to the marker 94 and that the marker 93 should correspond to the marker 96. These conclusions in respect of the corresponding markers are drawn by means of the arithmetic unit 84.

The diagram of FIG. 3 again shows the above iterative steps and the individual successive calculation steps are denoted by arrows 1.1 to 1.5 and 2.1 to 2.5, 3.2.

After determination of the corresponding markers in the two 3D image data sets, the corresponding transformation rule can be determined by means of the unit 85, said transformation rule mathematically canceling a shift and/or rotation of the object to be imaged between the acquisition of the first and the second 3D image data set. To this end, the movement of each marker from the position in the first 3D image data set to the position in the second 3D image data set is determined. Finally, the relevant transformation rule is determined from the movements of all points, said transformation rule being used to transform one of the two 3D image data sets to the co-ordinate system of the other 3D image data set.

The transformation rule has three shift parameters and three angle parameters. Using said geometrical data, the transformation can be performed by rotation and displacement of one of the 3D image data sets. The 3D image data sets are then moved, for example, by way of a trilinear interpolation or by way of a new reconstruction using adapted reconstruction volumes, to the correct geometrical position. Subsequently, the desired subtraction of the two 3D image data sets may be performed.

Figure 4C:
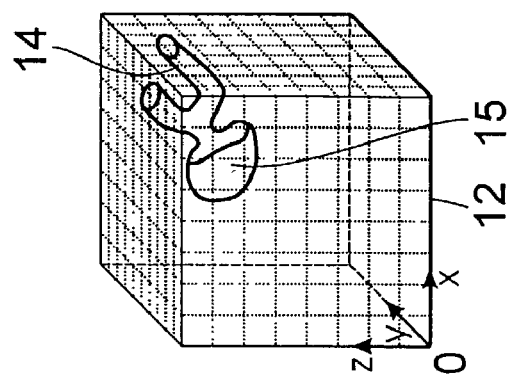
FIG. 4c is a composite of the co-ordinate systems shown in FIGS. 4a and 4b, after registration, transformation and subtraction.
Figure 4B:
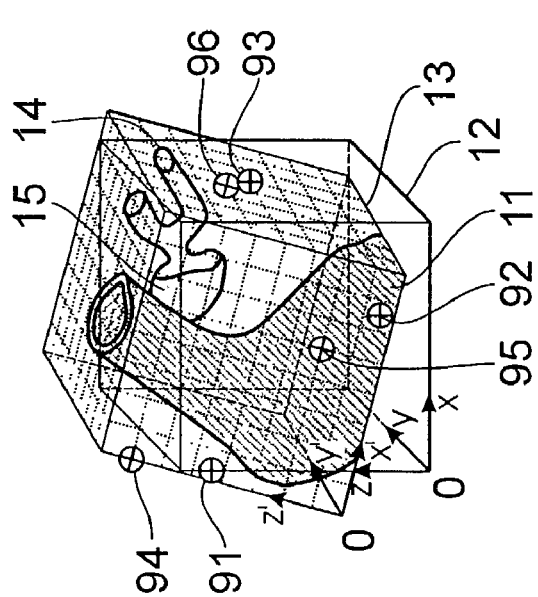
Figure 4A:
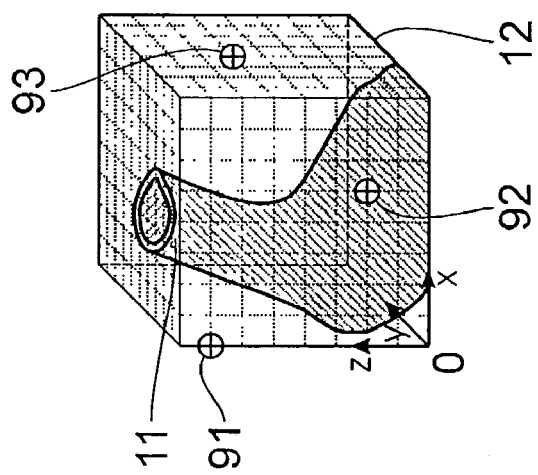
FIG. 4a is a co-ordinate system showing a bone structure.

This is shown in detail again in FIG. 4. FIG. 4a shows a first co-ordinate system 12 in which a first 3D image data set is shown in which a bone structure 11 is represented by way of example. The markers 91, 92, 93 are also shown in the co-ordinate system 12. FIG. 4b shows a second co-ordinate system 13 which has been rotated relative to the co-ordinate system 12. This means that the object to be imaged, for example, the patient has turned over accordingly prior to the acquisition of the second 3D image data set. The second 3D image data set again shows the bone structure 11 and also two blood vessels 14 with an aneurysm 15, because a contrast medium has been injected prior to the acquisition of the second 3D image data set. The second 3D image data set also shows the markers 94, 95, 96 which have moved accordingly relative to the original positions (91, 92, 93) of the same markers; these original positions are also shown again for the sake of comparison, but do not form part of the second 3D image data set.

Finally, FIG. 4c shows the result of the method in accordance with the invention after registration, calculation of the transformation rule, appropriate transformation and subtraction of the two 3D image data sets after their registration and move to a corresponding co-ordinate system. The bone structure 11 as well as the markers have canceled one another, so that only the vessels 14 with the aneurysm 15 remain visible in the co-ordinate system 12 in which the second 3D image data set has been transformed by means of the transformation rule.

Instead of the distances between the individual markers in the relevant 3D image data sets, the angles between two straight lines which extend through two different markers and intersect in a third marker can be determined and used to determine the corresponding markers. Two of such straight lines g1 and g2, extending through the markers 91 and 92, respectively, and intersecting one another at the angle α in the marker 93, are shown by way of example in FIG. 2a. In the case of three markers, three angles can thus be determined in each 3D image data set and for each angle the corresponding angle in the other 3D image data set can be determined. In as far as the corresponding angle can be unambiguously determined, for the marker at the apex, that is, the marker 93 in FIG. 2a, the corresponding marker at the corresponding apex in the second 3D image data set would also be known directly, that is, without further iterative steps being required. However, such a table of angles generally is larger than a distance table, because three marker positions are required in order to define each angle, whereas only two marker positions are required to define a distance. Consequently, the number of angles to searched so as to determine the correspondence of the angles is larger.

The invention is of course not limited to the described or shown embodiments, but generally extends to any embodiment, which falls within the scope of the appended claims as seen in light of the foregoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

For example, in a further embodiment, it may also be arranged that a mixture of distances and angles is used to determine the corresponding markers. Furthermore, the invention is not limited to digital subtraction angiography, but can in principle be used whenever two 3D image data sets have to be registered relative to one another in order to eliminate possible shifts or rotations of the object to be imaged. The 3D image data set may also originate from different modalities, be it that the markers must always be provided in identical positions on the object to be imaged. The method in accordance with the invention, moreover, can be used for the registration of more than two 3D image data sets in that, for example, each 3D image data set is registered with the preceding 3D image data set or in that one of the 3D image data sets is used as a reference image data set with which all other sets are registered.

Having described a preferred embodiment of the invention, the following is claimed:

1. A method for the registration of two 3D image data sets of an object to be imaged which is provided with a plurality of markers which are contained in the 3D image data sets, the method comprising the steps of:
   a) positioning the plurality of markers on the object to be imaged;
   b) determining the positions of the markers in the 3D image data sets in a co-ordinate system associated with the relevant 3D image data set;
   c) determining at least one of a distance between two markers and an angle between two straight lines which intersect in one of the plurality of markers, each of the lines respectively defined by extending through another different marker of the plurality of markers;
   d) determining at least one of a corresponding distance and a corresponding angle in both of the 3D image data sets;
   e) determining the corresponding markers in each of the 3D image datasets on the basis of the at least one corresponding distance and angle; and
   f) determining a transformation rule for the transformation of one of the 3D image data sets to the co-ordinate system of the other 3D image data set;
   wherein the markers are arranged such that the distances between any two markers and the angles between any two straight lines which intersect in a marker and extend through two further markers are each unique.

2. The method of claim 1 wherein at least three markers are provided on the object to be imaged and are contained in the 3D image data set, and a combination of at least three of the distances and angles are determined.

3. The method of claim 1 wherein the corresponding markers are iteratively determined from the corresponding determined distances.

4. The method of claim 1 wherein the corresponding markers are obtained directly at the point of intersection of the straight lines from the determined corresponding angles.

5. The method of claim 1 wherein the markers are formed by at least one of artificial markers provided on the object to be imaged and anatomic features.

6. The method of claim 1 including the step of subtraction angiography in order to register and transform two 3D image data sets to a common co-ordinate system prior to the formation of a subtraction image.

7. The method of claim 1 including the steps of obtaining a first partial 3D image data set and a second partial 3D image dataset, and combining the incomplete first and second partial 3D image data sets so as to form a combined 3D image data set.

8. A device for the registration of two 3D image data sets of an object to be imaged which is provided with a plurality of markers which are contained in the 3D image data sets, the device comprising:
   a) means for determining the positions of the markers positioned on the object to be imaged in the 3D image data sets in a co-ordinate system associated with the relevant 3D image data set;
   b) means for determining at least one of a distance between two markers and an angle between two straight lines which intersect in one of the plurality of markers, each of the lines respectively defined by extending through another different marker of the plurality of markers;
   c) means for determining at least one of a corresponding distance and a corresponding angle in the 3D image data sets;
   d) means for determining the corresponding markers on the basis of the at least one of the determined corresponding distance and the corresponding angle; and
   e) means for determining a transformation rule for the transformation of one of the 3D image data sets to the co-ordinate system of the other 3D image data set; wherein the markers are arranged such that the distances between any two markers and the angles between any two straight lines which intersect in a marker and extend through two further markers are each unique.

9. An imaging device for the acquisition of medical 3D image data sets of an object to be imaged, the imaging device comprising one of a magnetic resonance imaging system, a computed tomography imaging system, an x-ray imaging system and an ultrasound imaging system; and
   a device for the registration of 3D image data sets comprising:
      means for determining the positions of the markers positioned on the object to be imaged in the 3D image data sets in a co-ordinate system associated with the relevant 3D image data set;
      means for determining at least one of a distances between two markers and an angle between two straight lines which intersect in one of the plurality of markers, each of the lines respectively defined by extending through another different marker of the plurality of markers;
      means for determining at least one of a corresponding distance and a corresponding angle in the 3D image data sets;

means for determining the corresponding markers on the basis of the at least one of the determined corresponding distance and the corresponding angle; and means for determining a transformation rule for the transformation of one of the 3D image data sets to the co-ordinate system of the other 3D image data set wherein the markers are arranged such that the distances between any two markers and the angles between any two straight lines which intersect in a marker and extend through two further markers are each unique.

10. The imaging device of claim 9 wherein the imaging device is a C-arm X-ray device.

11. A device for the registration of two 3D image data sets of an object to be imaged, each 3D image data set having a corresponding co-ordinate system, the device comprising:

means for marking at least three different locations on the object to be imaged;

means for determining the position of each marking means in each of the two 3D images;

means for determining the distances between any two marking means and the angles formed by any three marking means in each of the 3D images;

means for determining corresponding marking means between the two 3D images by comparing the distances and angles formed between the marking means; and means for determining a transformation rule for the transformation of one of the 3D image data sets to the co-ordinate system of the other 3D image data set;

wherein the marking means are arranged such that the distances between any two marking means and the angles formed by any three marking means are each unique.

* * * * *